Mar. 3, 1925.
T. H. CHATTEN
1,528,246
TRAIN PIPE ANGLE COCK
Filed July 17, 1924   2 Sheets-Sheet 1
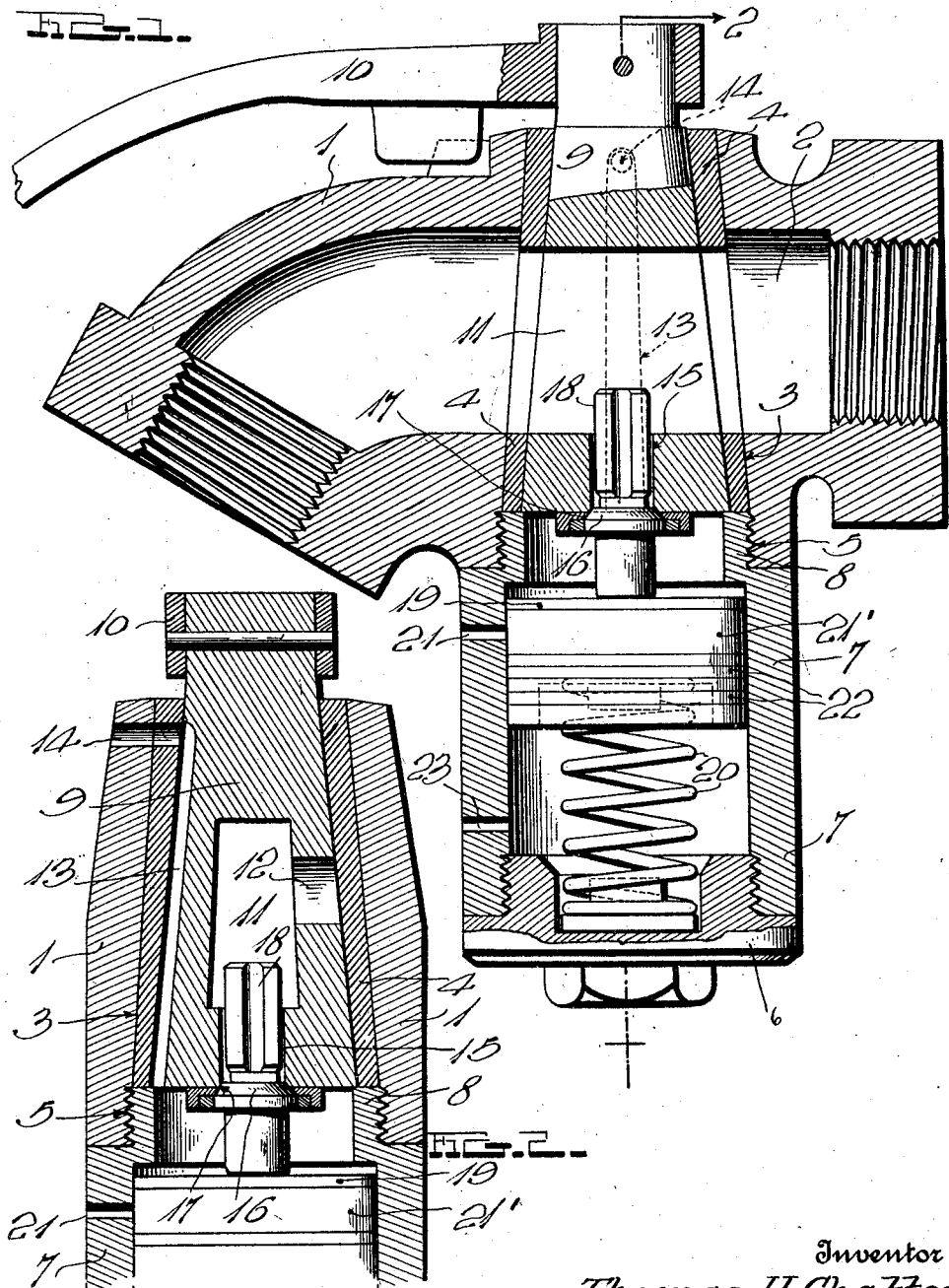
Witness
H. Woodard
Inventor
Thomas H. Chatten
By H. B. Willson &co.
Attorneys

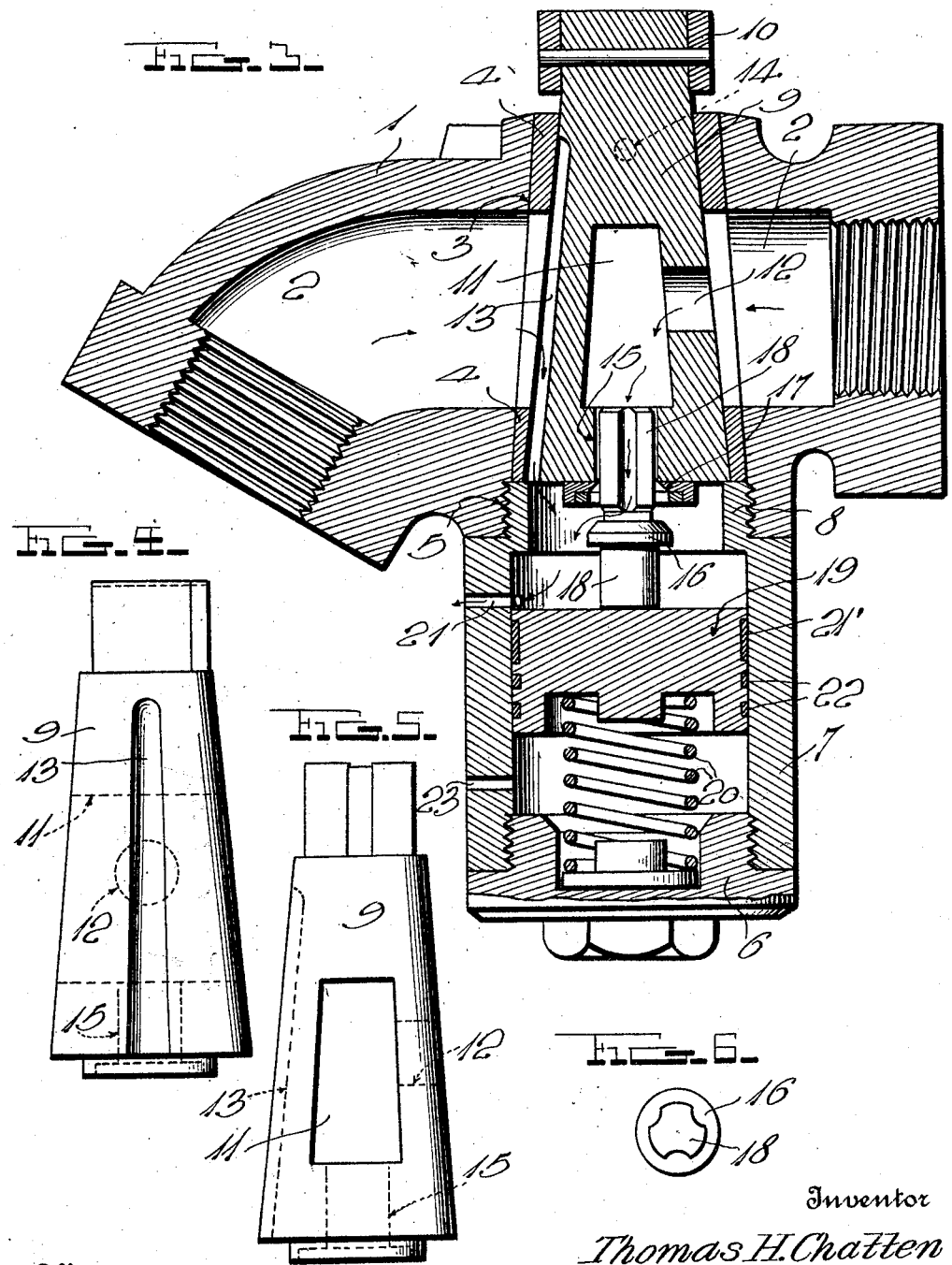

Patented Mar. 3, 1925.

1,528,246

UNITED STATES PATENT OFFICE.

THOMAS H. CHATTEN, OF EVANSVILLE, INDIANA, ASSIGNOR OF ONE-HALF TO MARION P. LEDGERWOOD, OF EVANSVILLE, INDIANA.

TRAIN-PIPE ANGLE COCK.

Application filed July 17, 1924. Serial No. 726,578.

*To all whom it may concern:*

Be it known that I, THOMAS H. CHATTEN, a citizen of the United States, residing at Evansville, in the county of Vanderburg and State of Indiana, have invented certain new and useful Improvements in Train-Pipe Angle Cocks; and I do declare the following to be a full, clear, and exact description of the invention, such as will enable others skilled in the art to which it appertains to make and use the same.

My invention relates to improvements in the angle cocks or valves commonly used on train pipes at the front and rear ends of the cars, one object of the invention being to provide a simple and inexpensive, yet an efficient and reliable angle cock which will automatically exhaust fluid pressure from the train pipe in both directions from its location, in case the rotatable plug of the cock should be left in a totally or partially closed position, or should accidentally assume such a position. Thus, the brakes of the train are automatically applied and it cannot proceed until the closed or partly closed angle cock is located and again opened.

Another object of the invention is to provide a construction in which a number of the old parts of an ordinary angle cock, may be used with certain new features, to provide a device automatically operable in the manner above set forth.

With the foregoing in view, the invention resides in the novel subject matter hereinafter described and claimed, the description being supplemented by the accompanying drawings.

Figure 1 is a vertical sectional view of the improved angle cock, showing the valve plug in open position.

Figure 2 is a vertical transverse sectional view as indicated by line 2—2 of Fig. 1, parts being broken away.

Figure 3 is a view similar to Fig. 1 but illustrating the association of parts when the valve plug is closed.

Figures 4 and 5 are elevations of the rotatable valve plug, looking in different directions.

Figure 6 is an end elevation of a valve to be hereinafter described.

In the drawings above briefly described, the numeral 1 designates an ordinary angle cock body having a main fluid passage 2 therethrough, said body being also formed with a transverse valve-plug-receiving bore 3 whose wall is preferably provided with a bushing 4 in the usual manner. At the lower end of the bore 3, the body 1 is formed with the usual external socket 5 which, in the ordinary angle cock, is closed by a screw plug 6. This plug however, when reconstructing the angle cock in accordance with my invention, is removed from the socket 5 and forms a closure for the lower end of a cylinder 7, said cylinder having a reduced threaded upper end 8 which is threaded into the socket 5. It will thus be seen that the socket 5 is instrumental in attaching the cylinder 7 to the body 1, in axial alinement with the bore 3, and that the plug 6 which was previously used for reception in the socket, need not be discarded, but may be used to close the outer end of the cylinder.

A valve plug 9 is rotatably received within the bushing 4 and is provided with the usual operating handle 10 and transverse port 11 which is adapted to register with the passage 2 when the plug is in open position. Formed through one side of the plug 9 is a substantially radial port 12 which is adapted, when the valve is in a totally or partially closed position, to establish communication between the port 11 and the passage 2, as seen in Fig. 3. In the opposite side of the plug 9, a longitudinal port or groove 13 is formed, said port or groove establishing communication between the upper end of the cylinder 7 and a bleed port 14 in the body 1 when the plug 9 is in open position, as seen in Figs. 1 and 2. When the plug is totally or partially closed however, the port 13 places the upper end of the cylinder 7 in communication with the portion of the passage 2, at one side of the plug 9, as will be clear by reference to Fig. 3. Formed axially through the lower end of the plug 9, is a port 15 which, when the parts stand about as shown in Fig. 3, co-operates with the ports 11 and 12 in establishing communication between the upper end of the cylinder 7 and one end of the passage 2.

The port 15 is normally closed by a suitable valve 16 engaging an appropriate seat 17 at the lower end of said port, said valve having a grooved or other suitably shaped stem 18 slidably mounted in the port as shown. The lower end of the valve abuts a piston 19 which is slidable in the cylinder 7, said piston being raised by the pressure of a coiled spring 20, when the valve plug 9 stands in the open position shown in Fig. 1, or substantially in such position. When this plug is totally or partially closed however, fluid pressure from the passage 2 will discharge through the port 13 as indicated by the arrows in Fig. 3, such fluid pressure entering the upper end of the cylinder 7 and forcing the piston 19 downwardly until it uncovers a pressure outlet 21 formed in the cylinder wall. Depression of the piston 19, permits pressure from the passage 2 to unseat the valve 16 and flow through the ports 11, 12 and 15 into the upper end of the cylinder 7, so that pressure from both sides of the plug 9 may escape through the open discharge passage 21. This escape of fluid so lowers the pressure in the train pipe, that the brakes will automatically apply to the cars both in front of and behind the particular angle cock which has been moved from its fully open position. Thus, the train will be brought to a standstill until the totally or partially closed angle cock is located and again opened. As soon as the plug 9 is moved to its fully open position, the spring 20 returns the piston 19 and valve 16, pressure from the upper end of the cylinder 7 being then exhausted through the port 13 and the bleed port 14. Then, pressure within the train pipe must be restored to normal before the brakes will release and the train can proceed.

In the preferred form of construction, the piston 19 is provided with a wide piston ring 21' which controls the port 21, and it may if desired be equipped with other relatively narrow rings 22. The port 23 shown in Figs. 1 and 3, is merely a vent to prevent either the trapping of air in the lower end of the cylinder 11 or the formation of a vacuum therein, which would impair movement of the piston 19.

It will be seen from the foregoing that a very simple, inexpensive and advantageous device has been provided, and attention may be directed to the fact that the common angle cock plug may be used, by simply forming the ports 13, 15 and 12 therein. Also, the usual angle cock body is employed, the usual plug 6 may be used, and the well known handle 10 may also be used, so that very few new parts are needed.

As excellent results are obtainable from the details disclosed, such details are preferably followed, but within the scope of the invention as claimed, numerous modifications may be made.

I claim:—

1. A train pipe cock comprising a body having a main fluid passage and a valve-plug-receiving bore transverse to said passage, a cylinder carried by the body in axial alinement with said bore, a valve plug rotatable in said bore for controlling said main fluid passage and ported to admit fluid into the cylinder from one side of the plug when the latter is totally or partially closed, said plug also having portage for admitting fluid into the cylinder from the other side of said plug, a valve for closing said portage when the plug is in open position, and a spring-held piston in the cylinder for holding said valve closed until fluid is admitted into said cylinder from said one side of the plug, said cylinder having a fluid outlet controlled by the piston.

2. A train pipe cock comprising a body having the usual main fluid passage, valve-plug-receiving bore transverse to said passage, and an external socket at one end of said bore; a cylinder having an open end threaded into said socket, a valve plug rotatable in said bore for controlling said main fluid passage and ported to admit fluid into the cylinder from one side of the plug when the latter is totally or partially closed, said plug also having portage for admitting fluid into the cylinder from the other side of said plug, a valve for closing said portage when the plug is in open position, and a spring-held piston in the cylinder for holding said valve closed until fluid is admitted into said cylinder from said one side of the plug, said cylinder having a fluid outlet controlled by the piston.

3. A structure as specified in claim 2; the outer end of said cylinder being closed by a threaded plug formerly received in the socket of the body.

4. A train pipe cock comprising a body having a fluid passage, a rotatable valve plug extending across said passage and having a main port for registration therewith when the plug is in open position, a cylinder carried by the body in axial alinement with the plug, said plug being formed with an axial pressure relief port from said main port to said cylinder, one side of said plug having a substantially radial port leading to said main port and adapted to communicate with the fluid passage when the plug is in totally or partially closed position, the opposite side of said plug being formed with a longitudinal port also adapted to communicate with the fluid passage when the plug is totally or partially closed, the last named port discharging into said cylinder, an outwardly opening valve normally closing the aforesaid axial port, and a spring-held piston in the cylinder for holding said valve closed when the plug is in open position, said piston being movable to valve opening position by pressure escaping through said longitudinal port when the plug is totally or partially closed, the aforesaid cylinder being provided with a pressure outlet controlled by the piston.

5. A structure as specified in claim 4; said body having a bleed port for communication with said longitudinal port of the plug when the latter is in open position.

6. An attachment for an angle cock body, comprising a cylinder having an open end externally threaded for reception in a socket of the body, a valve within said open end of the cylinder for closing a port of a valve plug within the body, and a spring-held piston in the cylinder for controlling said valve, said cylinder having a pressure escape port controlled by said piston.

7. A structure as specified in claim 6; the other end of the cylinder being open and internally threaded to receive a plug formerly seated in the socket of the cock body.

In testimony whereof I have hereunto affixed my signature.

THOMAS H. CHATTEN.